United States Patent
Terakura

(10) Patent No.: US 7,178,988 B2
(45) Date of Patent: Feb. 20, 2007

(54) OPTICAL CONNECTOR PLUG AND METHOD FOR ASSEMBLING SAME

(75) Inventor: Atsuhiro Terakura, Matsudo (JP)

(73) Assignee: Seikoh Giken Co., Ltd. (JP)

( * ) Notice: Subject to any disclaimer, the term of this patent is extended or adjusted under 35 U.S.C. 154(b) by 0 days.

(21) Appl. No.: 10/891,066
(22) Filed: Jul. 15, 2004

(65) Prior Publication Data
US 2005/0013549 A1    Jan. 20, 2005

(30) Foreign Application Priority Data
Jul. 15, 2003    (JP) ............................ P2003-196897

(51) Int. Cl.
*G02B 6/38* (2006.01)
*G02B 6/36* (2006.01)

(52) U.S. Cl. ........................ 385/69; 385/53; 385/55; 385/58; 385/60; 385/62; 385/75; 385/76; 385/77; 385/78; 385/81; 385/86; 385/87

(58) Field of Classification Search ............... 385/53, 385/55–94
See application file for complete search history.

(56) References Cited

U.S. PATENT DOCUMENTS 4,747,659 A    5/1988    Takahashi (Continued)

FOREIGN PATENT DOCUMENTS

JP    H04-69369    6/1992

(Continued)

OTHER PUBLICATIONS

"F 01 Type Connectors for Optical Fiber Cables" Japanese Industrial Standard, JIS C 5970, published by Japanese Association, Japan, 1998.

(Continued)

*Primary Examiner*—Frank G. Font
*Assistant Examiner*—Ryan Lepisto
(74) *Attorney, Agent, or Firm*—Carlson, Gaskey & Olds

(57) ABSTRACT

An optical connector plug adapted to be freely and readily attached to or detached from either an SC or an FC connector adapter comprising a housing that couples to the adapter and attaches the plug to the adapter, a plug frame disposed within the housing, which plug frame supports a ferrule secured to one end of an optical fiber and a flange secured around the outside of the ferrule such that the ferrule and the flange can rotate around the axial center of the ferrule, and a plug holder, disposed inside the housing, for positioning the ferrule in relation to the housing by non-incrementally rotating the ferrule to any determinable angle in relation thereto, the plug holder having a coupling part that couples to a groove formed in the flange and is capable of rotating in relation to the plug frame around the center axis of the ferrule. A method for assembling an optical connector plug adapted to be attached to or detached from either an SC type or an FC type optical connector adapter is also disclosed wherein the step of grinding ferrule and optical fiber end faces is performed before the ferrule is inserted into a plug holder and plug frame. The method also includes the steps of aligning the optical fiber by non-incrementally rotating the plug holder in relation to the plug frame and then securing the plug holder to the plug frame.

10 Claims, 11 Drawing Sheets

U.S. PATENT DOCUMENTS

| | | | |
|---|---|---|---|
| 5,633,970 A * | 5/1997 | Olson et al. | 385/78 |
| 5,682,451 A * | 10/1997 | Lee et al. | 385/78 |
| 6,238,101 B1 * | 5/2001 | Chen et al. | 385/60 |
| 2002/0081077 A1 * | 6/2002 | Nault | 385/78 |
| 2003/0031422 A1 * | 2/2003 | Inagaki et al. | 385/72 |
| 2003/0215191 A1 * | 11/2003 | Taira et al. | 385/78 |
| 2004/0184739 A1 * | 9/2004 | Rondeau et al. | 385/54 |

FOREIGN PATENT DOCUMENTS

| | | |
|---|---|---|
| JP | 2002-006174 | 1/2002 |
| JP | 2004-102251 | 4/2004 |

OTHER PUBLICATIONS

"F 01 Type Connectors for Optical Fiber Cords" Japanese Industrial Standard, JIS C 5973, published by Japanese Standards Association, Japan, 1998.

* cited by examiner

OPTICAL CONNECTOR PLUG AND METHOD FOR ASSEMBLING SAME

CROSS-REFERENCE TO RELATED APPLICATIONS

This application is based upon and claims the benefit of priority from Japanese Patent Application No. 2003-196897 filed on Jul. 15, 2003, the entire content of which is incorporated by reference herein.

BACKGROUND OF THE INVENTION

1. Field of the Invention

The present invention relates to optical connectors and more specifically to an optical connector plug, a plug frame and a plug holder comprising the plug, and a method for assembling the plug.

2. Description of Related Art

When performing maintenance or operation for optical transmission equipment and the like, optical fiber cables in the input/output sections of the equipment must be connected and disconnected. A variety of optical connectors are used to enable such connection and disconnection to be performed easily.

A conventional SC type optical connector (hereinafter "SC connector"), in other words, an F04 type single fiber optical connector regulated according to JIS C 5973, and its method of assembly will now be described.

The conventional SC connector comprises an SC connector plug fixed to an end of an optical fiber cable and an SC connector adapter that enables the plug to be readily attached and detached.

FIG. 1 is a longitudinal cross-sectional view of a conventional SC connector plug 100. FIG. 2 is a cross-sectional view along the line II—II of FIG. 1, with the outer housing 102 described subsequently omitted in FIG. 2.

In the case of the optical fiber cable secured to the plug 100, an end of the optical fiber FB1 is secured and supported by a ferrule FE1 shown in dash-dot lines. A cylindrical flange FL1 is secured at the rear end FE2 of the ferrule FE1. Grooves FL2 are formed around the flange FL1 to restrict rotation of the flange FL1 around the central axis thereof.

As shown in FIG. 1, the plug 100 has an outer housing 102 that engages with an adapter (not shown) to couple the plug 100 to the adapter. The housing 102 forms the external shape of the plug 100. A protrusion (not shown) is formed around the outer periphery of the outer housing 102. When the plug 100 is inserted in the adapter, the plug 100 is positioned by means of this protrusion.

A plug frame 104 is arranged at the front end of the outer housing 102 (the end closest to the adapter to be connected, i.e., the left side in FIG. 1). The plug frame 104 is located adjacent the end 100A of the plug 100.

The plug frame 104 comprises a cavity 104A for accommodating the ferrule FE1, and a cavity 104B located at the end of plug frame 104A adjacent the base or end 100B of the plug 100. Cavity 104B accommodates the flange FL1 and receives and connects with the engaging end part 106A of a plug holder 106, described hereinafter.

The plug frame 104 accommodates the ferrule FE1 such that the axis of the ferrule FE1 is positioned along the lengthwise direction or longitudinal axis of the outer housing 102. The respective axes of the cavity 104A and the cavity 104B are substantially coincident. The internal diameter of the cavity 104B is larger than the smallest diameter 104F of the cavity 104A, adjacent to the cavity 104B. The cavity 104B is aligned and connected with the cavity 104A and together with the cavity 104A, forms a through bore in plug frame 104.

The plug frame 104 further comprises a ferrule positioning part or shoulder 104C for positioning the ferrule FE1 along the axial direction of the plug 100. The ferrule positioning part 104C is an annular surface connecting the cavity 104A with the cavity 104B, and is in contact with the surface of flange FL1 facing the end 100A of the plug 100.

Protrusions 104D, which protrude toward the center axis of the cavity 104B and engage the grooves FL2 of the flange FL1, are formed on the interior surface of the cavity 104B at the end thereof adjacent the cavity 104A. The protrusions 104D facilitate positioning the ferrule FE1 and flange FL1 such that the ferrule FE1 and flange FL1 cannot rotate around the axis of the ferrule FE1.

More specifically, four grooves FL2 are provided around the external surface of the flange FL1 at equi-angularly spaced (90°) locations in relation to the axis of the flange FL1, while four protrusions 104D that engage the grooves FL2 are provided around the interior surface of the cavity 104B at equi-angularly spaced (90°) locations in relation to the axis of the cavity 104B. Thus, the angular position of the ferrule FE1 and flange FL1 in relation to the axis of the plug 100 can be changed in 90° increments.

In the outer housing 102, a plug holder 106 is disposed at the rear end of the plug frame 104 (i.e., at the right end of the optical fiber cable as viewed in FIG. 1).

The plug holder 106 comprises an engaging part 106A at the front end thereof that engages in the cavity 104B of the plug frame 104. The plug holder 106 further comprises a spring housing cavity 106B disposed at the front end of the plug holder 106 and a through bore 106C in communication with the spring housing cavity 106B which extends along the longitudinal axis of the plug holder 106. The optical fiber FB1 runs through the through bore formed by the spring housing cavity 106B and the through bore 106C.

The internal diameter of the spring housing cavity 106B is greater than that of the through bore 106C. An annular surface 106D that connects the spring housing cavity 106B and the through bore 106C forms a bearing surface for compressing a compression spring 108.

The compression spring 108 disposed between the bearing surface 106D and the flange FL1 biases the flange FL1 to urge it into contact with the ferrule positioning part or annular surface 104C of the plug frame 104.

The plug holder 106 is inserted into the plug frame 104 and is secured therein by coupling a connecting claw 106E of the plug holder 106 with an engaging cavity 104E formed in the plug frame 104.

According to the above configuration, inside the plug 100, the end of the ferrule FE1 is positioned adjacent the end 100A of the SC connector plug 100 and the flange FL1 and ferrule FE1 are positioned such that the axis of the ferrule FE1 extends in the longitudinal direction of the plug 100.

As described, the ferrule FE1 and flange FL1 cannot rotate axially around the axis of the ferrule FE1, but can move somewhat in the axial direction of the plug 100 in relation to the plug frame 104. That is to say, as the flange FL1 is biased by the compression spring 108 into contact with the ferrule positioning part or surface 104C, the ferrule FE1 and flange FL1 are unable to move in a direction toward the end 100A of the plug 100, but due to the resiliency of the compression spring 108, the ferrule FE1 and the flange FL1 can move in the opposite direction, that is, toward the base 100B of the plug 100.

The inner diameter of the narrowest part 104F of the cavity 104A of plug frame 104 is somewhat larger than the outer diameter of the ferrule FE1. The inner diameter of the cavity 104B is also somewhat larger than the outer diameter of the flange FL1, and thus the ferrule FE1 and flange FL1 can move transversely somewhat, that is, perpendicular to the lengthwise direction of the plug 100.

The parts holding an optical fiber cable in the conventional SC connector plug 100 will now be described.

An optical fiber cable comprises an optical fiber FB1 as described above, an interstitial filler (not shown) made of aramid fiber covering the optical fiber FB1, and a sheath (not shown) covering around the outside thereof.

In the outer housing 102, a cylindrical tubular-shaped filler caulking ring 110 for holding the interstitial filler of the optical fiber cable is disposed surrounding the rear end of the plug holder 106. The end of the interstitial filler is inserted between the filler caulking ring 110 and the plug holder 106, and secured therebetween by caulking the filler caulking ring 110.

In the outer housing 102, a cylindrical tubular-shaped sheath caulking ring 112 for holding the sheath of the optical fiber cable is also disposed surrounding the rear end of the filler caulking ring 110. The end of the sheath is inserted between the sheath caulking ring 112 and the filler caulking ring 110, and secured therebetween by caulking the sheath caulking ring 112.

In addition, in the outer housing 102, a boot 114 for protecting and covering the optical fiber is disposed around the filler caulking ring 110 and sheath caulking ring 112.

As the end of the optical fiber FB1 is inserted into the through bore provided in the ferrule FE1 and adhered therein, the optical fiber FB1 extends from ferrule FE1 to the rear end of the plug holder 106, the optical fiber FB1 covered in the interstitial filler extends from the rear end of the plug holder 106 to the rear end of the filler caulking ring 110, and the optical fiber cable extends from the rear end of the filler caulking ring 110.

The SC connector 100 can be attached or detached simply by insertion in or removal from an SC connector adapter. More specifically, when the plug 100 is pressed into the adapter, a connecting claw (not shown) provided in the adapter is pushed open by the outer housing 102 of the plug 100. As the plug 100 is pushed farther into the adapter, the connecting claw engages with the protrusion of the outer housing 102 and is locked in place thereby such that the plug 100 is firmly connected to the adapter.

Further, holding the outer housing 102 and pulling the plug 100 away from the adapter has the effect of urging the connecting claw open as the outer housing 102 slides out in relation to the adapter, releasing the lock, such that further pulling on the plug 100 enables the plug 100 to be removed from the adapter.

FIG. 3 is a diagram showing the steps for assembling the conventional SC connector plug 100 on an optical fiber cable.

At step S101, a part of the components comprising the plug 100 is passed through with the optical fiber cable. More specifically, the optical fiber cable passes in order, through the boot 114, the sheath caulking ring 112, the filler caulking ring 110, the plug holder 106 and the compression spring 108.

At step S103, pre-processing of the end of the optical fiber cable is performed. This involves the process of exposing the interstitial filler at the end of the optical fiber cable and the process of exposing the optical fiber FB1.

At step S105, the optical fiber FB1 is passed through the flange FL1, through the through hole of ferrule FE1 and is positioned and adhered in the ferrule FE1 such that the tip end of the optical fiber FB1 protrudes somewhat from the through hole of the ferrule FE1. In addition, the flange FL1 is press fitted and secured to the ferrule FE1.

At step S107, the tip of the optical fiber FB1 protruding slightly from the through hole of the ferrule FE1 is cut off.

At step S109, the ferrule FE1 and flange FL1 are inserted into the plug frame 104 and, together with the plug holder 106 and the compression spring 108, are passed through with the optical fiber in advance and inserted into the cavity 104B of the plug frame 104; thereby assembling the plug frame 104, the plug holder 106, the ferrule FE1 and flange FL1 and the compression spring 108.

At step S11, the filler caulking ring 110 is caulked, fixing the interstitial filler of the optical fiber cable, and the sheath caulking ring 112 is caulked, fixing the sheath of the optical fiber cable.

At step S113, the filler caulking ring 110 and sheath caulking ring 112 are covered with the boot 114, and the boot 114 is fixed to the plug holder 106.

At step S115, the plug holder 106 and the plug frame 104 are inserted in the outer housing 102 and secured therein.

At step S117, the end face of the ferrule FE1 positioned at the end 100A of the plug 100 is ground, together with the end face of the optical fiber FB1 secured in the ferrule FE1.

At step S119, these ground end faces are inspected.

At step S121, the assembled plug 100 is attached to an adapter in an inspection device to conduct an inspection of the performance, such as the condition of optical connectivity.

At step S123, if favorable results are obtained from the performance inspection (step S121), the assembly is complete. If the results are not satisfactory, e.g., because the core of the optical fiber FB1 is shifted from center of the ferrule FE1 such that the optical fiber FB1 core is eccentrically positioned, the next step is to proceed to step S125, in which the ferrule FE1 is rotated 90° in relation to the plug frame 104 and the performance inspection of step S121 is performed again. This latter step (step S125) is repeated until favorable results are obtained in step S123.

A conventional FC type optical connector (FC connector), that is to say, an F03 type single fiber optical connector regulated according to JIS C 5970 will now be described.

This conventional FC connector comprises an FC connector plug secured at an end of an optical fiber cable and an FC connector adapter that enables the plug to be readily attached and detached.

FIG. 4 is a longitudinal cross-sectional view of a conventional FC connector plug 200. FIG. 5A is a cross-sectional view along the line VA—VA of FIG. 4, and FIG. 5B is a cross-sectional view along the line VB—VB of FIG. 4. To enable the configuration to be understood more easily, FIG. 5A shows only a plug frame 204 and a coupling ring 250, while FIG. 5B shows only a plug holder 206.

The FC connector plug 200 has a coupling nut 202 instead of the outer housing 102 of the SC connector plug 100. A further point distinguishing the plug 200 from the plug 100 is that the plug holder 206 is secured to the plug frame 204 by a screw connection. In all other respects, the FC connector plug 200 is essentially the same as the SC connector plug 100.

The plug 200 has a cylindrical plug frame 204 supporting a ferrule FE1 and flange FL1 in the same manner as the plug frame 104. A plurality (six as shown in FIG. 5A) of substantially the same shape protruding parts 204A are provided at substantially equi-angular intervals in a circumferential direction, around the intermediate part of the plug frame 204.

A coupling ring 250 engages around the outer periphery of the plug frame 204. A plurality (six as shown in FIG. 5A) of substantially same the shape protruding parts 250A are provided at substantially equi-angular intervals in a circumferential direction, at the rear end of the coupling ring 250.

The protruding parts 250A of the coupling ring 250 and coupling grooves formed between the protruding parts 204A of the plug frame 204 engage mutually together. Further, the protruding parts 204A of the plug frame 204 and the coupling grooves formed between the protruding parts 250A of the coupling ring 250 also engage mutually together. In this way, the coupling ring 250 cannot rotate in relation to the plug frame 204.

At the front end of the coupling ring 250, an engaging part 250B is provided to engage with a coupling groove formed in the adapter. When the plug 200 connects to the adapter as the engaging part 250B engages with this coupling groove in the adapter, the plug frame 204 or the ferrule FE1 supported by the plug frame 204 cannot rotate in relation to the adapter.

The plug frame 204 is surrounded by a cylindrical coupling nut 202. The coupling nut 202 provides a ring-shaped engaging part 202A around the inner circumferential surface of the middle part of coupling nut 202. The engaging part 202A contacts the protruding parts 204A of the plug frame 204 to prevent the coupling nut 202 from coming away from the plug 200 toward the front end thereof.

Around the inner surface of the front end of the coupling nut 202, a screw connecting part 202B is provided to screw together with a screw connecting part of an adapter (not shown). By screw connecting to the screw connecting part of the adapter, the screw connecting part 202B enables the plug 200 to be connected to the adapter.

In the intermediate part of the plug holder 206, an edge 206A with flats (FIG. 5B) is provided to be used for rotating the plug holder 206 with a spanner wrench when the plug holder 206 is screw connected to the plug frame 204. The edge 206A has an external diameter at the arc-shaped portion in the outer periphery thereof that is slightly smaller than the internal diameter of the through bore of the coupling nut 202.

In the FC connector plug 200, the part holding the optical fiber cable is configured substantially the same as the part holding the optical fiber cable of the SC connector plug 100.

The FC plug 200 operates such that the screw connecting part of the coupling nut 202 and screw connecting part of the adapter are mutually screw connected together, thereby enabling attachment to the adapter. Further, the plug 200 can be removed from the adapter by releasing the screw connection of the screw connecting part of the coupling nut 202 and the screw connecting part of the adapter.

FIG. 6 shows the steps for assembling the conventional FC connector plug 200 to an optical fiber cable. The steps are substantially the same as those for assembling the conventional SC connector plug 100 to an optical fiber cable and, thus, need not be described in further detail herein.

At step S221, if favorable results are not obtained from the performance inspection because the core of the optical fiber FB1 is shifted from center of the ferrule FE1, the next step, step S223 is proceeded to, in which the plug frame 204 and the coupling ring 250 are disengaged, rotated and then reengaged. The performance inspection is performed over again at step S221, with the attachment angle of the plug frame 204 in relation to an adapter of a testing device, being changed, for example, in 60° increments.

The optical connector disclosed in Japanese Unexamined Patent Publication No. 4-69369 comprises a plug secured to an end of an optical fiber cable and an adapter enabling this plug to be readily attached and detached in the same manner as applies with respect to an SC connector and an FC connector. The plug and adapter disclosed in that published application are connected by a bayonet connection.

With the plug of the optical connector, the ferrule can be positioned non-incrementally in relation to the plug, i.e., at any desired rotational angle. Accordingly, if favorable results are not obtained from the performance inspection, e.g., because the core of the optical fiber is shifted from center, the performance inspection is re-performed after the ferrule is non-incrementally rotated to any desired attachment angle in relation to the plug, enabling determination of the position that results in the minimum optical connection loss.

The optical connector disclosed in Japanese Unexamined Patent Publication No. 2002-6174 comprises a plug for a readily attachable/detachable optical connector in an SC connector adapter. Inside the plug frame of the plug, a flange coupling ring is provided, the angle of rotation of which in relation to the plug frame can be readily changed. In the flange coupling ring, an engaging part is provided to engage with a flange groove secured to the ferrule.

Rotating the flange coupling ring, when the engaging part of the flange coupling ring engages with the flange groove, rotates the ferrule and the optical fiber secured to the ferrule. In this way, the position of the fiber can be determined in relation to the plug to improve the connective efficiency of the optical connection when the plug is connected to the adapter.

With respect to the conventional SC connector plug 100, the attachment angle around the axis of the ferrule FE1 in relation to the plug 100 can only be changed in 90° increments. Moreover, with respect to the conventional FC connector plug 200, the attachment angle around the axis of the ferrule FE1 in relation to the plug 200 can only be changed in 60° increments.

Thus, the attachment angle around the axis of the ferrule FE1 in relation to the plug can only be adjusted in certain gradations and finer adjustments cannot be made. Accordingly, there are cases when it is not possible to alleviate the positional drift between the core of an optical fiber FB1 supported by a plug and the core of an optical fiber that is connected thereto, in order to reduce connection loss.

The optical connector disclosed in Japanese Unexamined Patent Publication No. 4-69369 allows the attachment angle around the axis of the ferrule in relation to the plug to be non-incrementally changed, however, the plug of this connector employs a bayonet type as the means of coupling the plug to the adapter, so connection is only possible to specific adapters. Accordingly, the problem arises that this plug cannot be coupled with a conventional SC connector adapter or a conventional FC connector adapter.

The optical connector disclosed in Japanese Unexamined Patent Publication No. 2002-6174 also allows the attachment angle around the axis of the ferrule in relation to the plug to be non-incrementally changed. However, a problem arises in the number of parts that must be employed, as it is necessary to provide a flange coupling ring inside the plug frame in order to rotate the ferrule. Further, in order to rotate the flange coupling ring to make the ferrule rotate, it is necessary to provide an opening in the plug frame and insert an elongate special tool from the opening. This makes adjusting the rotational angle of the ferrule in relation to the plug difficult.

SUMMARY OF THE INVENTION

In order to solve the aforementioned problems, it is an object of the present invention to provide a plug for an SC connector or an FC connector in which a ferrule can be rotated inside the plug without the use of a special tool, so that the ferrule can be non-incrementally positioned in relation to the plug at any desired attachment angle.

It is a further object of the present invention to provide a plug holder and a plug frame comprising the above-described plug.

Another object of the present invention is to provide a plug holder that can be used for either an SC connector plug or an FC connector plug.

In order to achieve the above-mentioned objectives, according to a first aspect of the present invention, an optical connector plug is provided that can be readily attached to or detached from either an SC type or an FC type optical connector adapter. The optical connector plug of the invention comprises a plug frame internally supporting a ferrule secured to an end of an optical fiber such that said ferrule can rotate around the axial center of said ferrule; and a plug holder rotatably supported by said plug frame around said axial center of the ferrule, said plug holder being non-rotatably secured to said ferrule around said axial center of the ferrule, and said plug holder having a holding part exposed outside of said plug frame, so that when assembling said optical connector plug, said ferrule is rotated to a desired rotation angle in relation to said plug frame.

According to a further aspect of the present invention, an optical connector plug is provided that can be readily attached to or detached from either an SC type or an FC type optical connector adapter. The optical connector plug of the invention comprises a housing that engages with an optical connector adapter to couple said optical connector plug to said optical connector adapter; a plug frame disposed within said housing, supporting a ferrule secured to one end of an optical fiber and a flange secured around the periphery of said ferrule such that said ferrule and said flange can rotate around the axial center of said ferrule; and a plug holder disposed within said housing and rotatably supported by said plug frame around said axial center of the ferrule, said plug holder being non-rotatably secured to said ferrule around said axial center of the ferrule, and said plug holder having a engaging part that engages to a groove formed in said flange and a holding part exposed outside of said plug frame, so that when assembling said optical connector plug, said ferrule is rotated to a desired rotation angle in relation to said plug frame.

According to a further aspect of the present invention, an optical connector plug is provided wherein said plug holder and said plug frame are threaded together.

According to another aspect of the present invention, a plug frame for an optical connector is provided, which is used for an optical connector plug that is readily attachable to and detachable from an SC type or FC type optical connector adapter. The plug frame of the invention comprises a first accommodating cavity for accommodating a ferrule secured to one end of an optical fiber such that said ferrule can rotate around the axis of said ferrule; a second accommodating cavity that forms a through bore in communication with said first accommodating cavity, and accommodates a flange secured to said ferrule such that said flange can rotate around the axis of said ferrule; a positioning part formed between said first accommodating cavity and said second accommodating cavity, for positioning said ferrule along the axial direction of said ferrule; and a screw connecting part that threads together with a screw connecting part of a plug holder for an optical connector.

According to another aspect of the present invention, a plug holder for an optical connector is provided, which is used for an optical connector plug that is readily attachable to and detachable from an SC or FC connector adapter. The plug holder comprises a through bore through which an optical fiber extends, an engaging part that engages with a flange secured to a ferrule securing one end of the optical fiber; and a screw connecting part that threads together with a screw connecting part of a plug frame for an optical connector.

According to yet another aspect of the present invention, a method for assembling an optical connector plug that can be readily attached to or detached from either an SC type or an FC type optical connector adapter is provided. The optical connector plug comprises a plug frame internally supporting a ferrule secured to an end of an optical fiber such that said ferrule can rotate around the axial center of said ferrule; and a plug holder rotatably supported by said plug frame around said axial center of the ferrule, said plug holder secured to said ferrule in the rotating direction around said axial center of the ferrule, and said plug holder having a holding part exposed outside of said plug frame, so that when assembling said optical connector plug, said ferrule is rotated to a desired rotation angle in relation to said plug frame, said assembling comprising the steps of: passing a plug holder through an optical fiber; inserting the end of said optical fiber in a ferrule and securing the end of said optical fiber in said ferrule; grinding the end face of said ferrule together with the end face of said optical fiber; and after grinding, inserting said ferrule and said plug holder into a plug frame, thereby assembling the main body of said plug.

According to yet another aspect of the present invention, a method for assembling an optical connector plug is provided further comprising the steps of: inserting said plug main body in an alignment adapter, then aligning said optical fiber by rotating said plug holder in relation to said plug frame; and after aligning, securing said plug holder to the plug frame.

According to yet another aspect of the present invention, a method of assembling an optical connector plug is provided, wherein said optical connector plug is adapted to couple to an SC connector adapter, said method further comprising the step of: after securing said plug holder to the plug frame, removing said plug main body from said alignment adapter, then inserting and securing said plug main body in a housing.

BRIEF DESCRIPTION OF THE ACCOMPANYING DRAWINGS

These and other objects, features and advantages will become clearer from the following description of exemplary embodiments of the invention, read in connection with the accompanying drawings in which:

FIG. 10 is assembled at an end of an optical fiber cable.

DETAILED DESCRIPTION OF THE INVENTION

Figure 1:
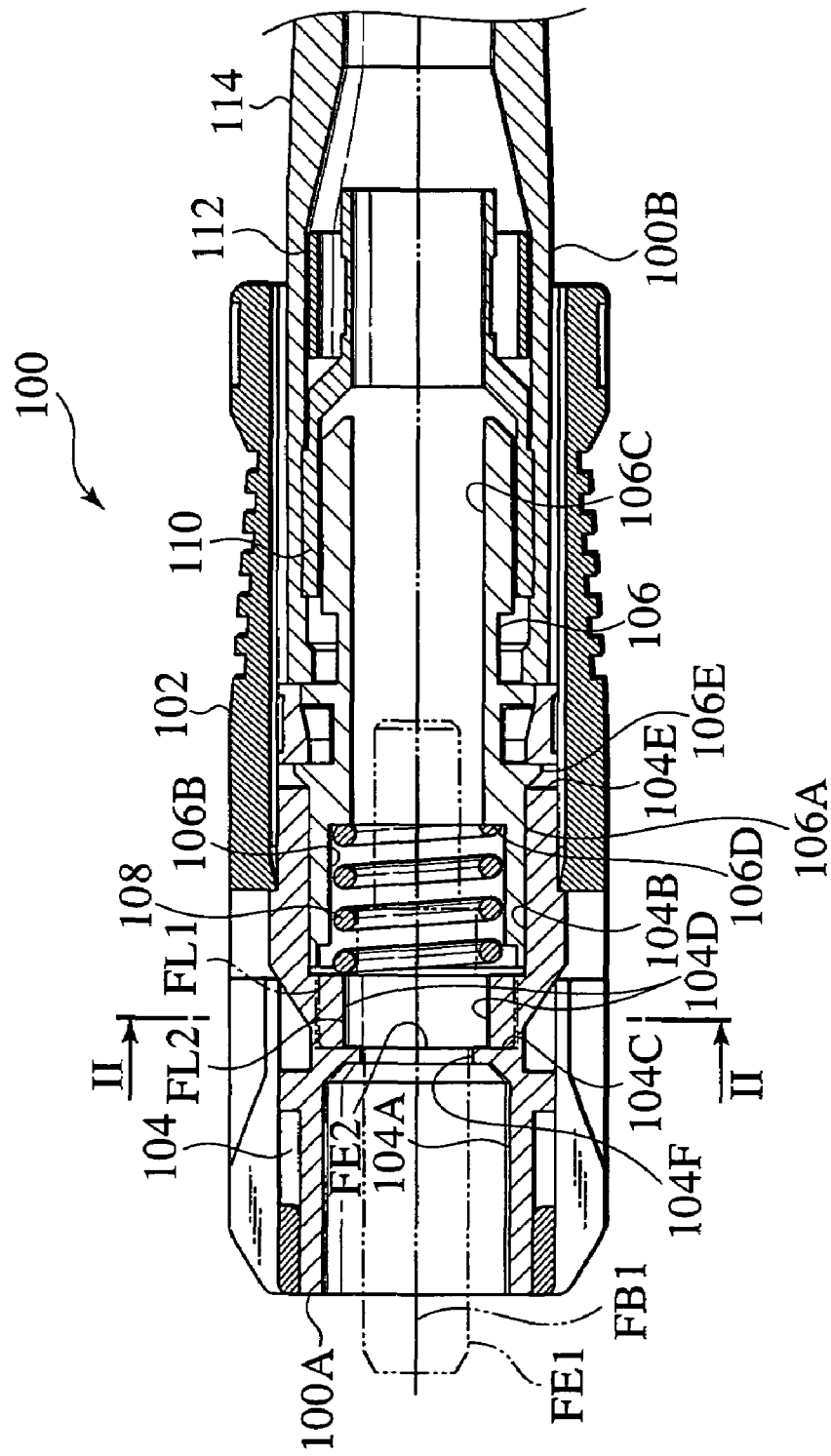
FIG. 1 is a cross-sectional view showing a conventional SC connector plug.
Figure 2:
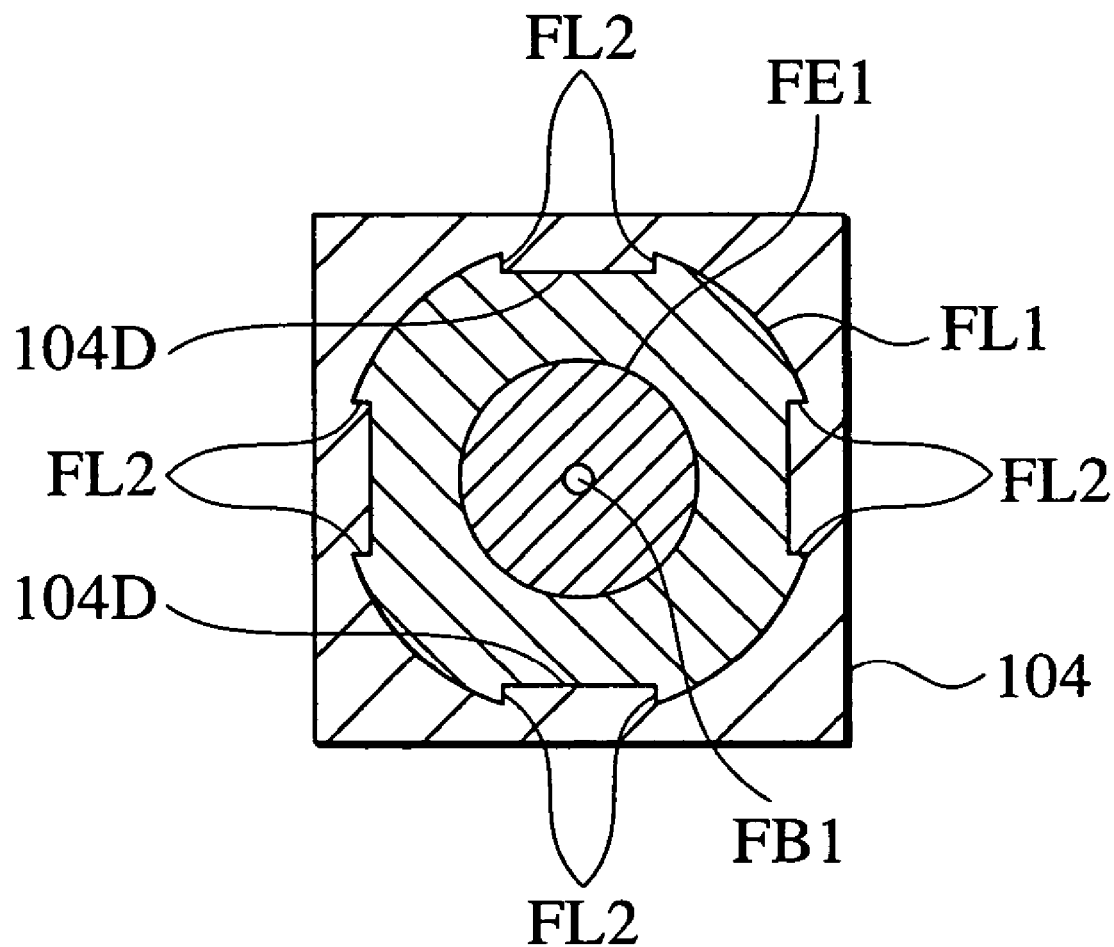
FIG. 2 is a cross-sectional view along the line II—II of FIG. 1.
Figure 3:
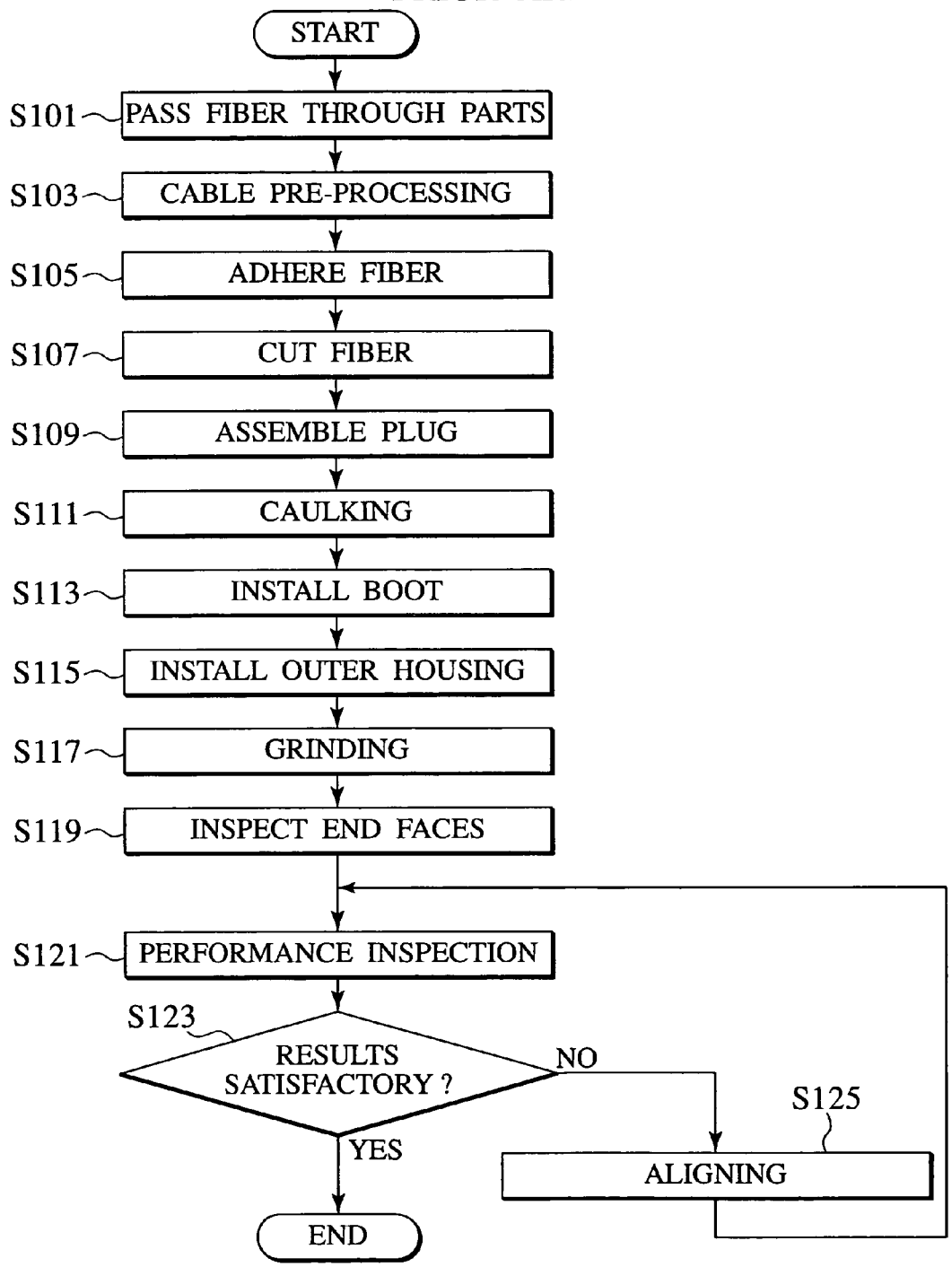
FIG. 3 is a flow chart showing the steps performed when the plug shown in FIG. 1 is assembled at an end of an optical fiber cable.
Figure 4:
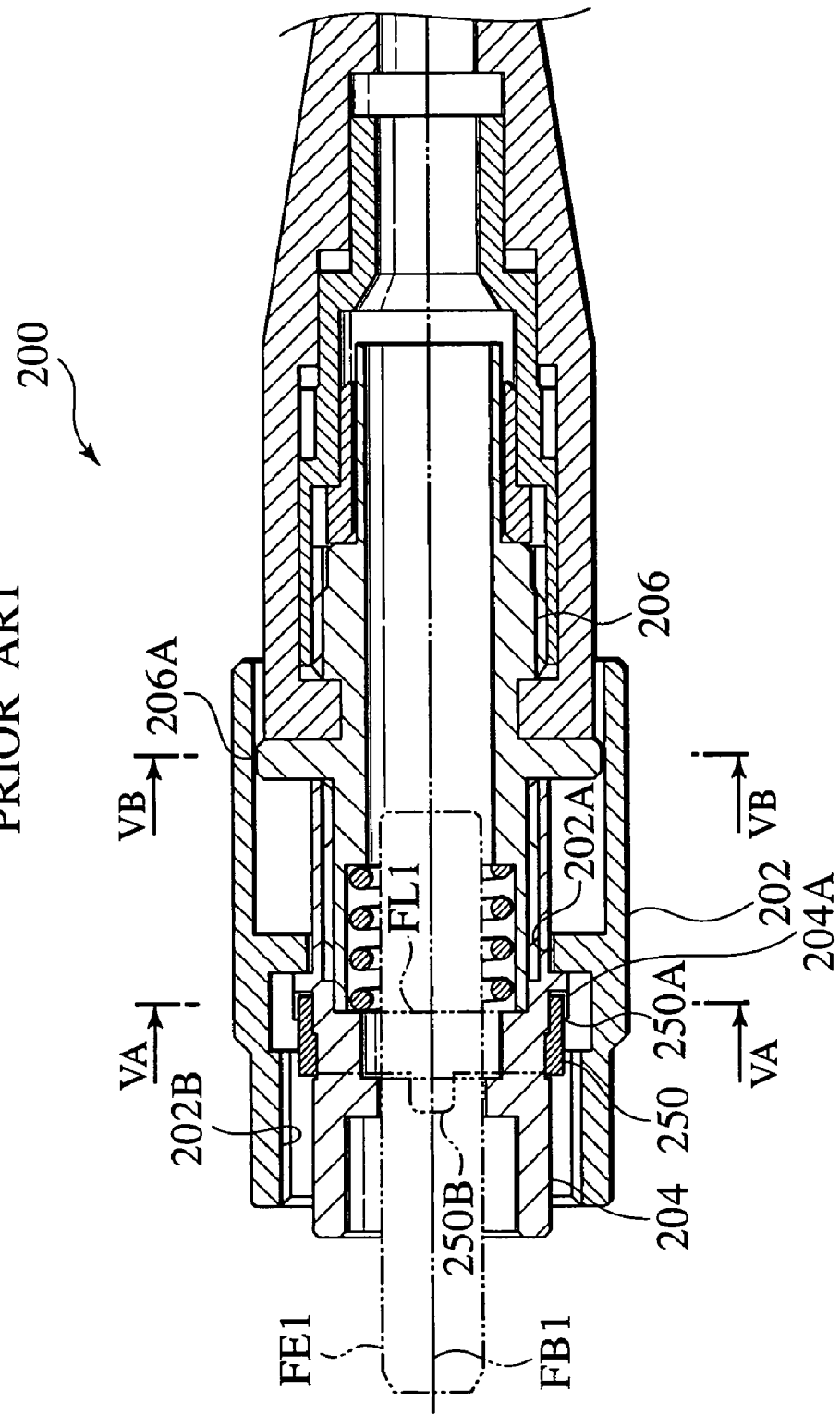
FIG. 4 is a cross-sectional view showing a conventional FC connector plug.
Figure 5A:
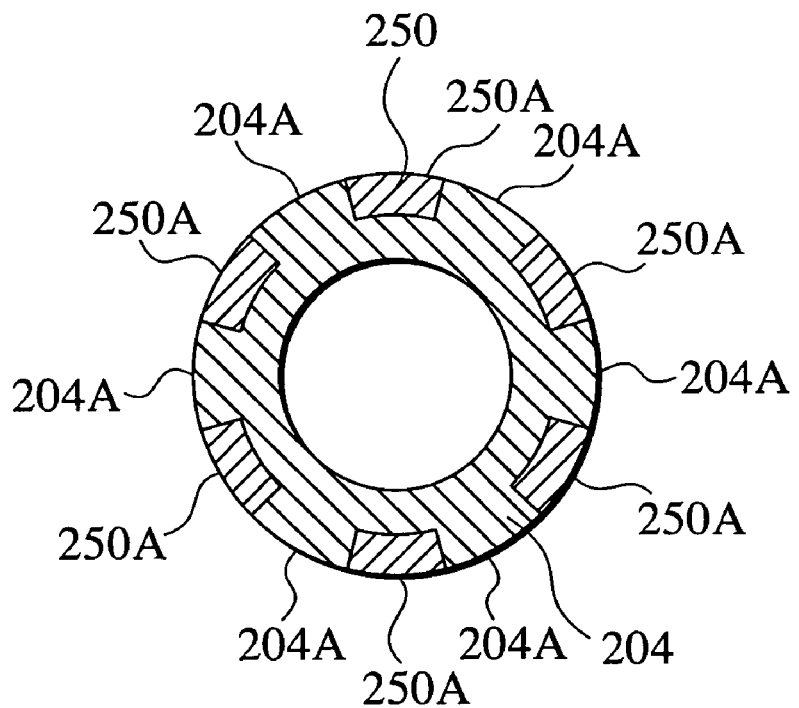
FIGS. 5A and 5B are cross-sectional views along the lines VA—VA and VB—VB respectively of the plug shown in FIG. 4.
Figure 5B:
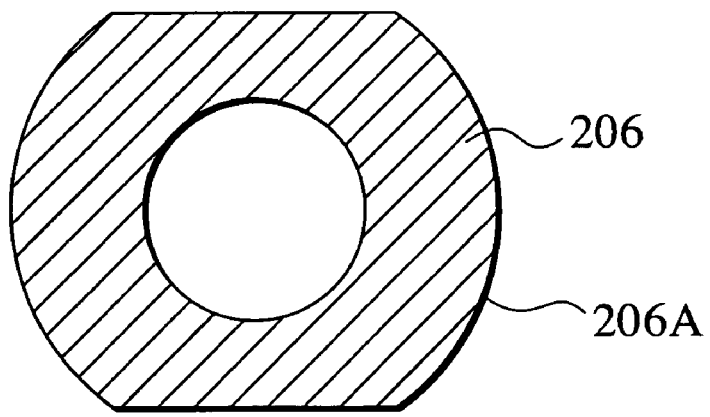
Figure 6:
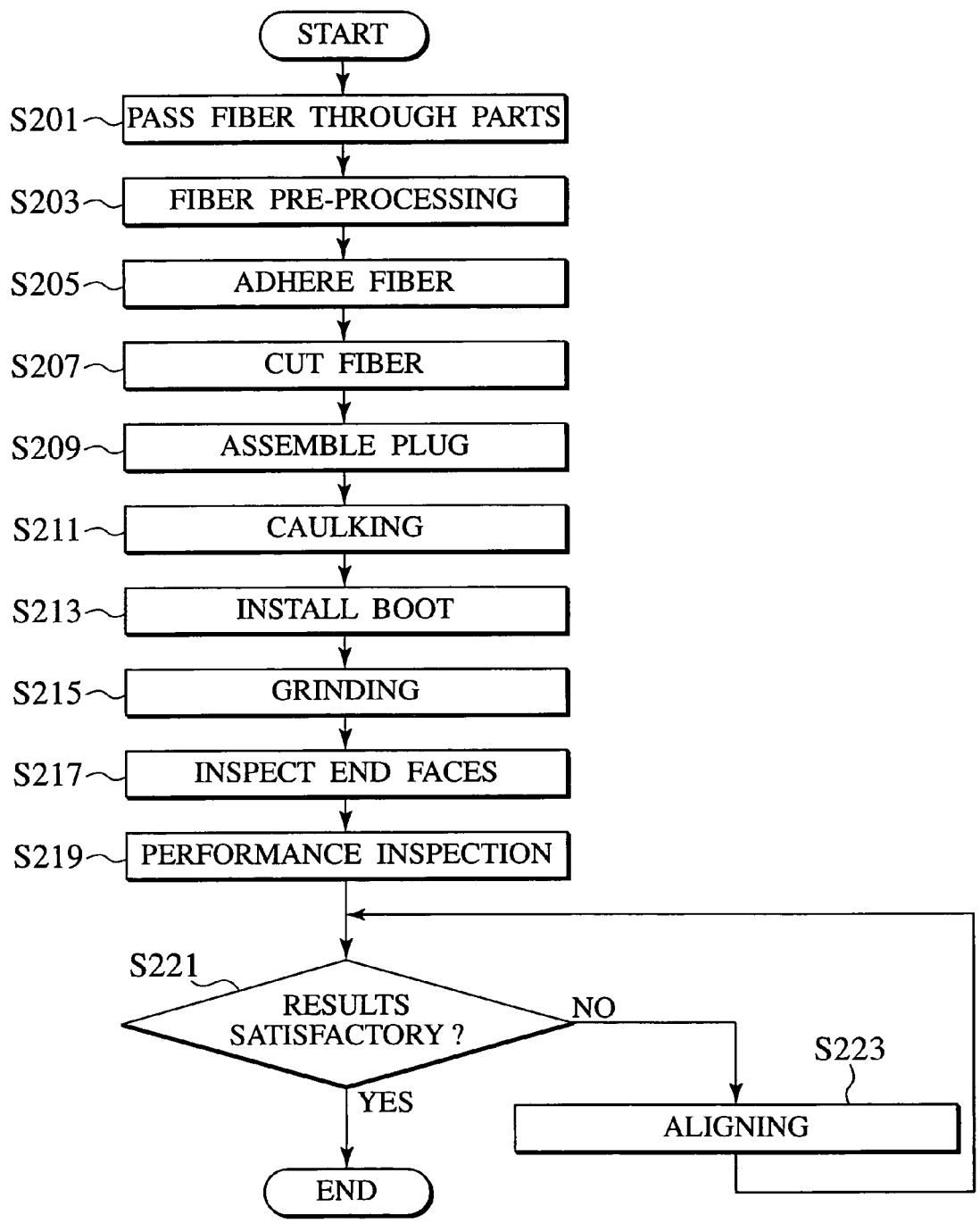
FIG. 6 is a flow chart showing the steps performed when assembling the plug shown in FIG. 4 at an end of an optical fiber cable.

Exemplary embodiments of the invention will now be described below with reference to the accompanying drawings. The described exemplary embodiments are intended to assist the understanding of the invention, and are not intended to limit the scope of the invention in any way. In these drawings, like reference numerals identify like elements.

Figure 7:
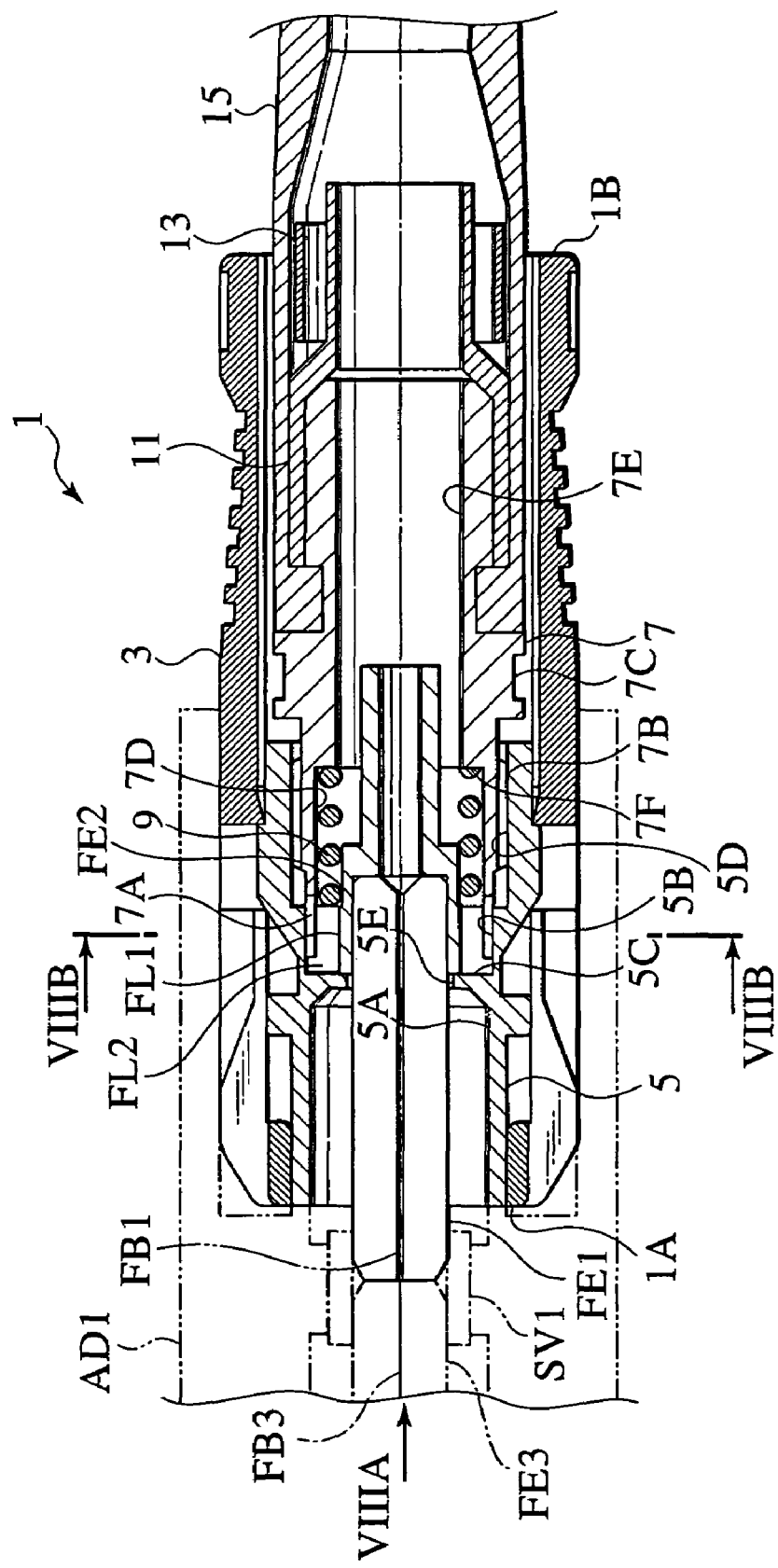
FIG. 7 is a cross sectional view showing an SC connector plug according to a first embodiment of the present invention.
Figure 8A:
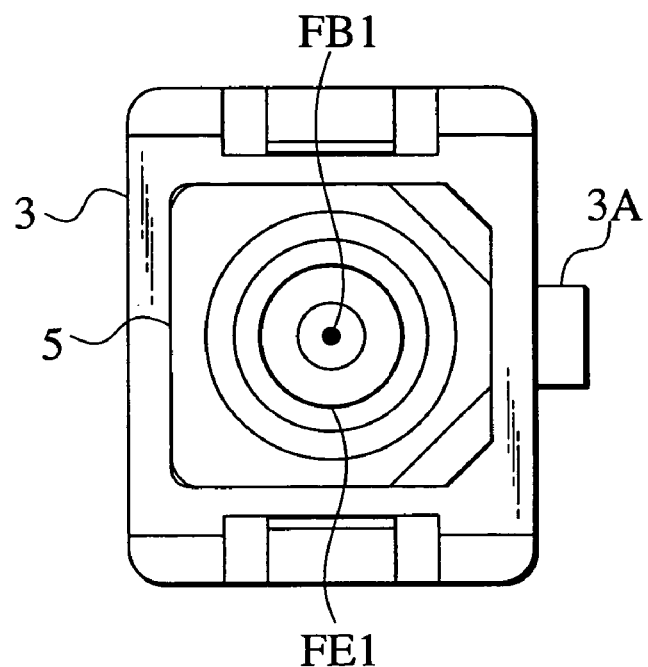
FIGS. 8A and 8B are cross sectional views along the lines VIIIA—VIIIA and VIIIB—VIIIB respectively of the plug shown in FIG. 7.
Figure 8B:
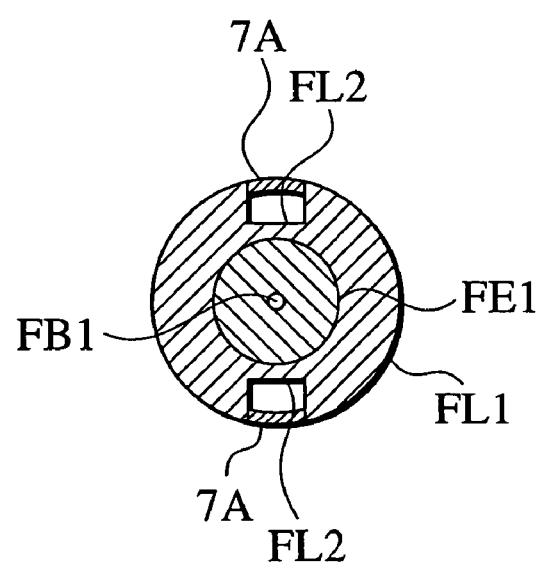

FIG. 7 shows a cross section of an SC connector plug 1 according to a first embodiment of the invention. FIG. 8A shows a cross-section along the line VIIIA—VIIIA of FIG. 7 and FIG. 8B shows a cross section along the line VIIIB—VIIIB of FIG. 7.

As shown in FIG. 7, a point of difference between the plug 1 and the conventional SC connector plug 100 is that the plug 1 is structured such that the ferrule FE1 supported therein can be positioned at a desired angle by freely rotating the ferrule FE1 around the center axis thereof in all other respects, the plug 1 is structured substantially the same as the plug 100.

The plug 1 has an outer housing 3 forming the external form of the plug 1, a cylindrical plug frame 5 disposed inside the outer housing 3 adjacent the end 1A of the plug 1 (the end closest to the adapter to be connected to the plug 1), and a cylindrical plug holder 7 disposed inside the outer housing 3 adjacent the rear end 1B of the plug 1 (the end closest to the secured optical fiber cable, the right side as shown in FIG. 7).

In the optical fiber cable secured to the plug 1, an end of an optical fiber FB1 is secured and supported by a ferrule FE1. A cylindrical flange FL1 is secured at the rear end FE2 of the ferrule FE1. Two rotational grooves FL2 (FIG. 8B) for rotating the flange FL1 around the axis of the ferrule FE1 are provided around the outer periphery of the flange FL1.

The plug 1 comprises the outer housing 3 that engages with a conventional SC connector adapter AD1 and that couples the plug 1 to the adapter AD1. The outer housing 3 forms the exterior form of the plug 1 and is of substantially the same form as the outer housing 102 of the conventional SC connector plug 100. Accordingly, an outer housing of an F04 type single fiber optical connector plug regulated by JIS C 5973 can be used for the outer housing 3.

A protrusion 3A (shown in FIG. 8A) is provided on the outer surface of the outer housing 3. When the plug 1 is inserted in the adapter AD1, the plug 1 is angularly positioned by the protrusion 3A.

Inside the outer housing 3, plug frame 5 is disposed along the lengthwise direction of the outer housing 3 on the end adjacent the end 1A of the plug 1.

The plug frame 5 comprises an accommodating cavity 5A capable of accommodating the ferrule FE1 and an accommodating cavity 5B capable of accommodating the flange FL1. The ferrule FE1 and the flange FL1 are rotatably supported within the plug frame 5 such that the end of the ferrule FE1 is positioned at the end 1A of the plug 1 and the axis of the ferrule FE1 extends along the lengthwise direction of the plug 1.

The center axis of the cavity 5A is substantially coincident with the center axis of the cavity 5B. The inner diameter of the cavity 5B is larger than the inner diameter of the narrowest part 5E of the cavity 5A, adjacent to the cavity 5B. The cavity 5B is disposed at the end closest to the base or end 1B of the plug 1. The cavity 5B communicates with the cavity 5A thereby providing a through bore extending in a lengthwise direction of the plug 1.

The plug frame 5 comprises a ferrule positioning part 5C for positioning the ferrule FE1 along the axial direction thereof. The positioning part 5C is an annular surface between the cavity 5A and the cavity 5B, and is in contact with the end of flange FL1 facing the end 1A of the plug 1.

Cylindrical plug holder 7 is disposed at the base end of the plug frame 5. The plug holder 7 has groove engaging parts 7A (FIGS. 7, 8B) disposed at the front end thereof that engage with the rotational grooves FL2 of the flange FL1. At the front end of the plug holder 7 around the outer periphery thereof is disposed a screw connecting part 7B that threads to a screw connecting part 5D disposed around the inner circumference of the cavity 5B at the end thereof closest to the base 1B of the plug 1. A holding part 7C used when the plug holder 7 is rotated in relation to the plug frame 5 is disposed around the outer periphery of the plug holder 7 toward the base or rear end of the screw connecting part 7B.

The plug holder 7 comprises a spring accommodating cavity 7D disposed at the front end of the plug holder 7 extending in a lengthwise direction thereof, and a through bore 7E that forms a continuous through bore together with the spring accommodating cavity 7D. The optical fiber FB1 extends through the continuous through bore formed by the through bore 7E and the spring accommodating cavity 7D.

The inner diameter of the spring accommodating cavity 7D is larger than the inner diameter of the through bore 7E. The annular surface between the spring accommodating cavity 7D and the through bore 7E forms a bearing surface or pressuring part 7F for urging a compression spring 9. The compression spring 9 disposed between the pressuring part 7F and the flange FL1 biases the flange FL1 to urge it into contact with the ferrule positioning part or annular surface 5C of the plug frame 5.

In the above described structure, inside the plug 1, the front end of the ferrule FE1 is positioned at the end 1A of the plug 1, and the ferrule FE1 and flange FL1 are arranged such that the axis of the ferrule FE1 extends in a lengthwise direction of the plug 1. The ferrule FE1 and flange FL1 can rotate around the center axis of the ferrule FE1. Further, in relation to the plug frame 5, the ferrule FE1 and flange FL1 can move slightly in the axial direction of the plug 1 against the bias of compression spring 9.

That is to say, as the flange FL1 is biased by the compression spring 9 and in contact with the positioning part 5C, the ferrule FE1 and flange FL1 cannot move in a direction from the base 1B of the plug 1 toward the end 1A of the plug 1, however, due to compressing of the compression spring 9, the ferrule FE1 and flange FL1 can move in the opposite direction from the end 1A of the plug 1 toward the base 1B of the plug 1.

Further, because the internal diameter of the narrowest part in the cavity 5A of the plug frame 5 is somewhat larger than the external diameter of the ferrule FE1, and the internal diameter of the accommodating cavity 5B is somewhat larger than the external diameter of the flange FL1, the ferrule FE1 and flange FL1 can move transversely somewhat in a plane perpendicular to the lengthwise direction of the plug 1.

The structure of those remaining parts holding the optical fiber cable in the plug 1 is substantially the same as those corresponding parts in a conventional SC connector plug 100.

Figure 11:
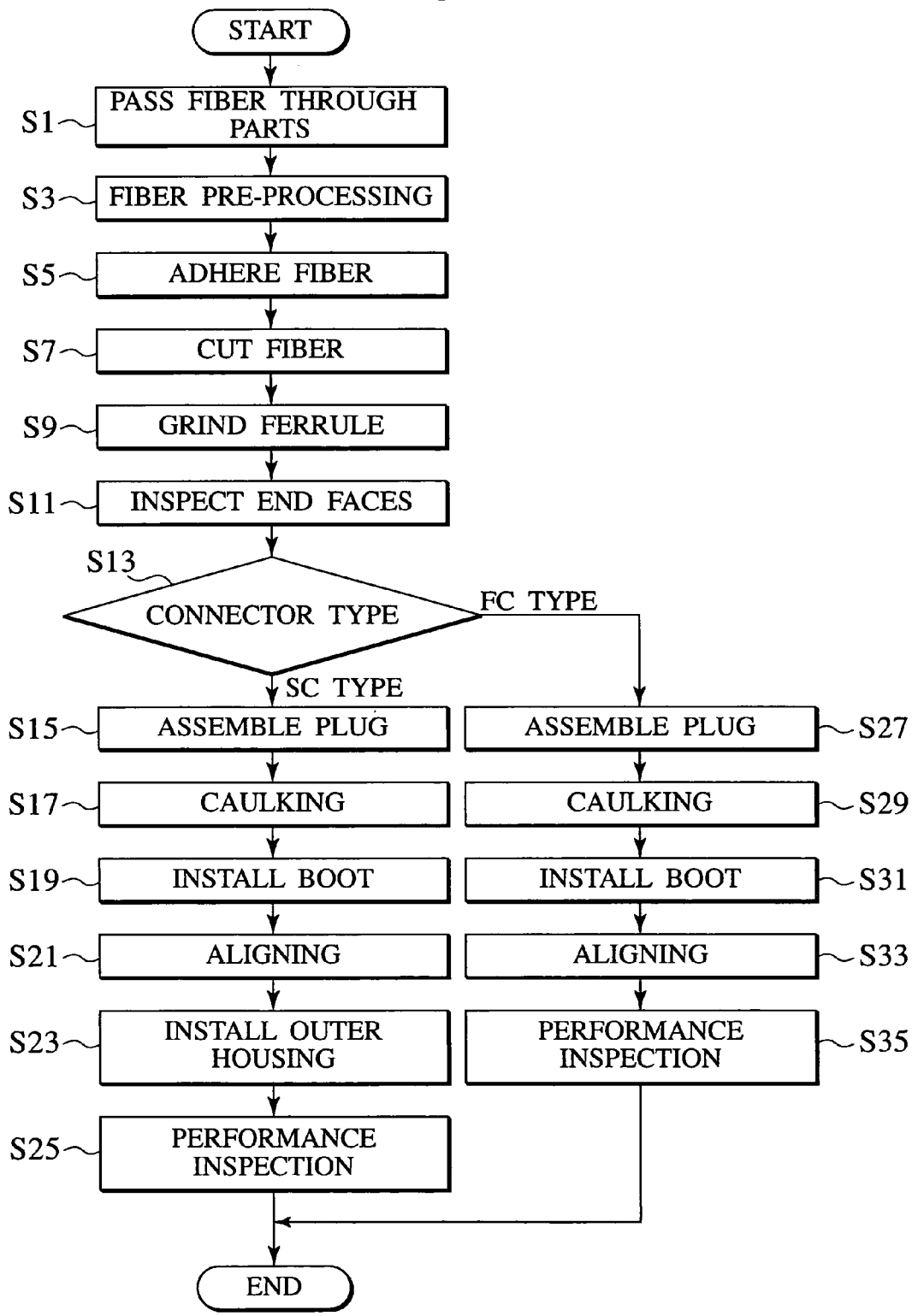
FIG. 11 is a flow chart showing the steps performed when either of the plugs shown in FIG. 7

The steps in the process of assembling the plug 1 of the first embodiment on an optical fiber cable will now be described with reference to FIG. 11.

In contrast to the assembly of the conventional SC connector plug 100, in the case of the plug 1, assembly of the plug occurs after grinding of the end face of the ferrule FE1.

At step S1, a part of the components of the plug 1 are passed through with the optical fiber cable. More specifically, in the same manner as applies with respect to the plug 100, the optical fiber cable passes through a boot 15, sheath caulking ring 13, filler caulking ring 11, plug holder 7 and compression spring 9 in that order.

At step S3, in the same manner as applies with respect to the conventional plug 100, pre-processes are performed on the end of the optical fiber cable. These pre-processes involve cutting the optical fiber cable sheath and interstitial filler and exposing a determined length of the optical fiber FB1.

At step S5, the optical fiber FB1 thus exposed is inserted into the through hole of the ferrule FE1 that is integrated with the flange FL1, and the end part of the optical fiber FB1 is adhered and secured in the ferrule FE1. More specifically, after injecting adhesive in the through hole of the ferrule FE1, the optical fiber FB1 is inserted into the through hole until the end thereof protrudes out from the end of the ferrule and the adhesive is then hardened.

At step S7, after the adhesive is hardened, the end of the optical fiber FB1 protruding out from the through hole of the ferrule FE1 is cut off.

At step S9, the end face of the ferrule FE1 is positioned in a grinding tool together with the end face of the optical fiber FB1 secured in the ferrule FE1, and these two end faces are then subject to the required grinding procedures.

At step S11, an inspection is performed of the ground end faces in order to examine whether or not the end face of the ferrule FE1 and optical fiber FB1 are ground as required.

At step S13, depending on the type of connector, the next step is to proceed to step S15 if the connector is an SC type or to step S27 if the connector is an FC type.

For an SC type connector, at step S15, the ferrule FE1 and flange FL1 are inserted in the plug frame 5, and the plug holder 7 and compression spring 9 previously passed through with the optical fiber cable are inserted in the accommodating cavity 5B of the plug frame 5. At this time, the screw connecting part 7B of the plug holder 7 is threaded together with the screw connecting part 5D of the plug frame 5. The plug frame 5, plug holder 7, ferrule FE1 and flange FL1, and the compression spring 9 are assembled together in this way.

At step S17, in the same manner as applies with respect to the conventional SC connector plug 100, the filler caulking ring 11 is caulked securing the interstitial filler of the optical fiber cable, and the sheath caulking ring 15 is caulked securing the sheath of the optical fiber cable.

At step S19, the filler caulking ring 11 and the sheath caulking ring 13 are covered with the boot 15, and the boot 15 is coupled to the plug holder 7.

At step S21, before the outer housing 3 is installed, the main body of the plug (hereinafter "plug main body") consisting of the plug frame 5, plug holder 7 and other components is connected to an alignment adapter, and the optical fiber FB1 held by the plug main body is aligned.

Referring to FIG. 7, the alignment adapter includes an adapter AD1 and a split sleeve SV1. A ferrule FE3 is secured at one end of the split sleeve SV1. An optical fiber FB3 is secured in the ferrule FE3 in a slightly eccentric position in a specific direction in relation to the central axis of the ferrule FE3. Further, the alignment adapter comprises an aligning master (not shown) adapted to engage with the outer periphery of the plug frame 5 and support the plug main body.

The alignment of the optical fiber FB1 in the plug main body is performed as follows.

Firstly, the plug main body is coupled with the alignment adapter. This causes the ferrule FE1 of the plug main body to be inserted in the other or rear end of the sleeve SV1 of the alignment adapter, and the optical fiber FB1 of the plug main body is optically connected to the optical fiber FB3 of the alignment adapter.

Next, the plug holder 7 is rotated in relation to the plug frame 5, and the plug holder 7 is secured in the plug frame 5 such that the rotational position of the plug holder 7 gives rise to the optimum conditions for optical connectivity between the optical fiber FB1 and the optical fiber FB3 of the alignment adapter.

More specifically, as the holding part 7C of the plug holder 7 is held and the plug holder 7 rotated, the flange FL1 and ferrule FE1 are rotated by the coupling of the groove engaging parts 7A of the plug holder 7 and the rotational grooves FL2 of the flange FL1. For example, as the holding part 7C is rotated from the starting position thereof non-incrementally over 360°, the rotational position providing the optimum optical connectivity conditions can be ascertained.

Adhesive is injected from an adhesive agent inlet (not shown) of the plug frame 5 between the screw connecting parts 5D and 7B of the plug frame 5 and the plug holder 7 respectively, and the adhesive agent is hardened, non-rotatably securing the plug holder 7 to the plug frame 5. Alternatively, for example, a locknut may be used to non-rotatably secure the plug holder 7 to the plug frame 5.

As the optical fiber FB3 of the alignment adapter is eccentrically positioned in a prescribed direction, application of the above-described method using the alignment adapter aligns the optical fiber FB1 of the plug main body such that the eccentric direction thereof is in the determined direction. Accordingly, if the eccentric direction of the optical fiber in the SC connector adapter is aligned to the eccentric direction of the alignment adapter, the optimum conditions for optical connectivity can be obtained when the plug 1 aligned by the alignment adapter is connected to the SC connector adapter.

At step S23, the plug main body is removed from the alignment adapter, and inserted and secured in the outer housing 3 to assemble the plug 1.

At step S25 the assembled plug 1 is coupled with the performance inspection master, and the optical connectivity conditions thereof are examined.

According to this first embodiment of an SC connector plug, the plug holder 7 is threadably connected to freely rotate in the plug frame 5. This permits rotation of the optical fiber FB1 supported in the plug 1 to a desired angle, enabling the angle of disposition of the optical fiber FB1 with respect to the plug 1 to be non-incrementally and finely adjusted.

In this way, even if the core of the optical fiber FB1 is somewhat displaced from the axial center of the ferrule FE1, when the optical fiber FB1 is connected to another optical fiber the positional displacement of the cores of those two optical fibers is extremely small thereby enabling optimum connection efficiency to be achieved.

Further, because the outer housing 3 forming the outer shape of the plug 1 is configured in the same manner as the outer housing of the conventional SC connector plug 100, the plug 1 can be connected to a conventional SC connector adapter regulated under JIS C 5973. Accordingly, the plug 1 of the invention is highly compatible and versatile.

In addition, because the holding part 7C is provided on the plug holder 7, an operator can simply hold the holding part 7 and manually rotate the plug holder 7 in relation to the plug frame 5 without using any special tools or equipment. Accordingly, the attachment angle of the optical fiber FB1 to the plug 1 can be easily finely adjusted.

The external diameter of the holding part 7C of the plug holder 7 is constructed larger than the internal diameter of the screw connecting part 5D of the plug frame 5 but smaller than the external diameter of the plug frame 5, so the plug holder 7 can be disposed in an outer housing 3 having a small external diameter.

Further, as the flange FL1 is rotated directly by the plug holder 7, neither additional parts nor an opening part are required as in the prior art in order for the flange to be rotated, thereby providing a simple structure for the plug.

In addition, as the assembly of the plug frame 5 and plug holder 7 is performed after the optical fiber FB1 is adhered to the ferrule FE1 and the end face of the ferrule FE1 is ground, if the optical fiber FB1 is adhered to the ferrule FE1 using a thermosetting adhesive for example, the holder for accommodating the ferrule FE1 when heating the ferrule FE1 can also be used as a ferrule holder supported by other forms of optical connector plug. Moreover, there is no concern about particulate matter arising during the grinding of the ferrule FE1 contaminating the plug.

Figure 9:
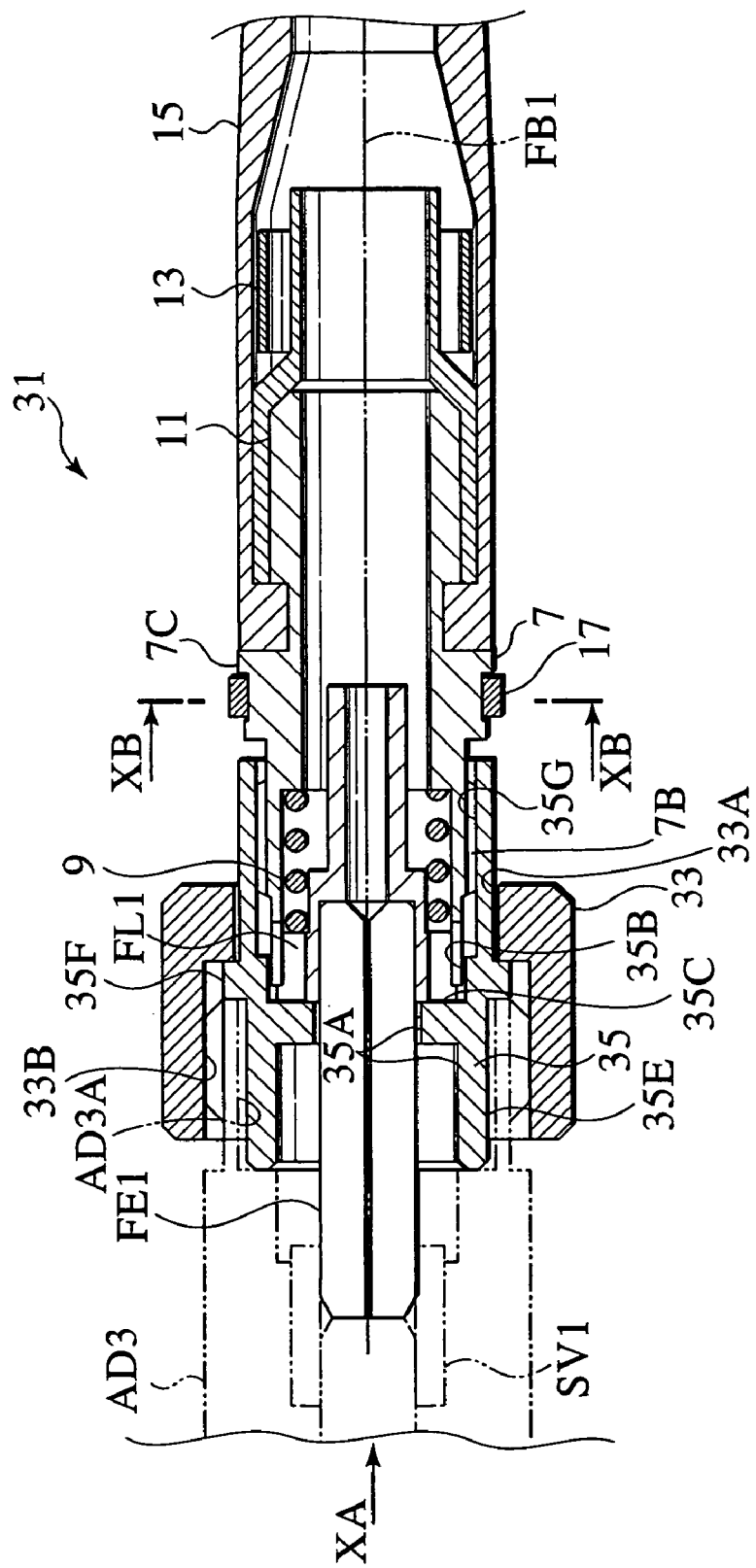
FIG. 9 is a cross sectional view of an FC connector plug according to a second embodiment of the present invention.
Figure 10A:
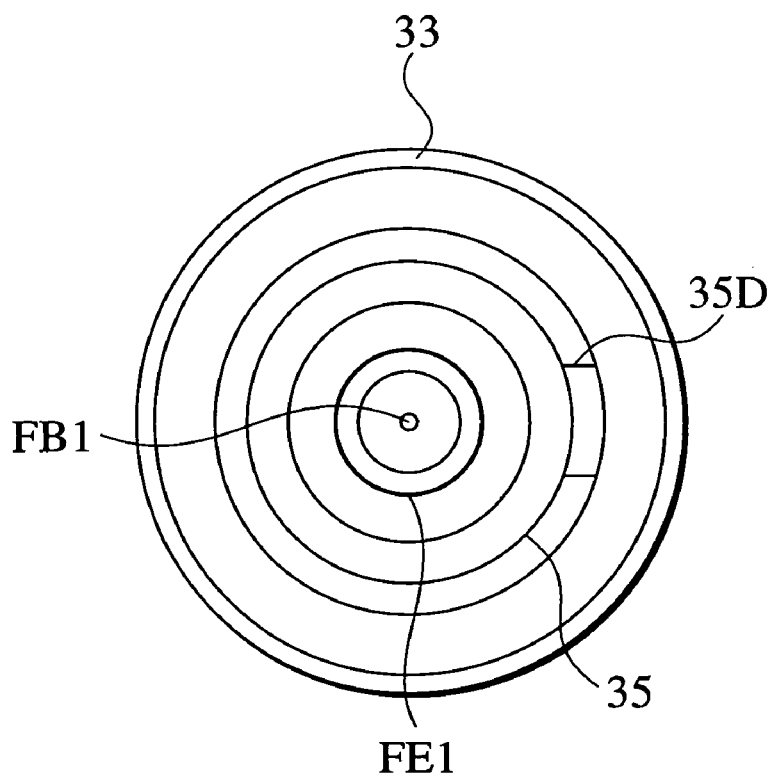
FIGS. 10A and 10B are cross-sectional views along the lines XA—XA and XB—XB respectively of the plug shown in FIG. 9.
Figure 10B:
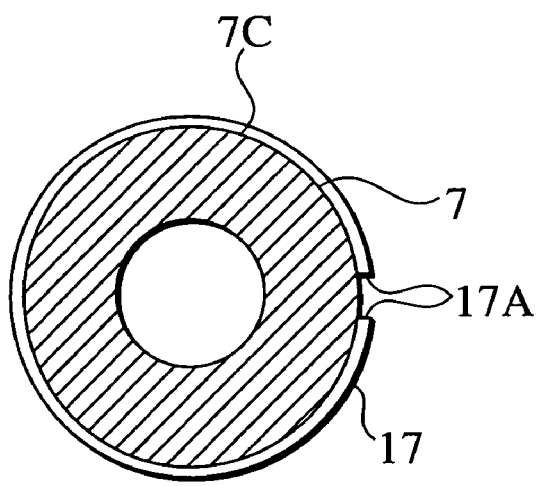

FIG. 9 shows a cross-section of an FC connector plug 31 according to a second embodiment of the invention. FIGS. 10A and 10B are cross-sectional views along the lines XA—XA and XB—XB respectively, of the plug shown in FIG. 9.

The plug 31 differs from the SC connector plug 1 according to the first embodiment in that the plug 31 is constructed to be attachable and detachable to and from a conventional FC connector adapter AD3 regulated in accordance with JIS C 5970.

That is to say, in order to facilitate attachment to an FC connector adapter AD3, instead of the plug frame 5 and outer housing 3 of the plug 1 according to the first embodiment, the plug 31 comprises a plug frame 35 and coupling nut 33. In all other respects the plug 31 is constructed substantially the same as the plug 1 of the first embodiment.

The plug 31 comprises a cylindrical plug frame 35, substantially the same as the plug frame 5 of the first embodiment, that supports a ferrule FE1 and flange FL1. In the same manner as the plug frame 5, the plug frame 35 comprises an accommodating cavity 35A capable of accommodating the ferrule FE1, an accommodating cavity 35B capable of accommodating the flange FL1, a ferrule positioning part 35C for positioning the ferrule FE1 along the axial direction thereof, and a screw connecting part 35G that combines in a mutual screw connection with a screw connecting part 7B of a plug holder 7.

A cylindrical engaging part 35E that is inserted into and engages with a cylindrical engaging part AD3A of the adapter AD3 is provided at the end (the end of the adapter AD3 to be coupled with the plug 31) of the plug frame 35. A flange 35F is disposed intermediate the lengthwise direction of the plug frame 35, the external diameter of which is larger than that of the engaging part AD3A. As the engaging part AD3A of the adapter AD3 engages with the plug frame 35, the plug frame 35 is unable to move further in the axial direction of the plug 31, i.e. toward the left side as viewed in FIG. 9.

An engaging part 35D (refer to FIG. 10A) that engages with an engaging groove (not shown) formed in the adapter AD3 is provided at the end of the plug frame 35 closest to the adapter AD3. As the engaging part 35D engages with the engaging groove of the adapter AD3 so that the plug 31 connects to the adapter AD3, the plug frame 35 or the ferrule FE1 supported by the plug frame 35 are prevented from rotating in relation to the adapter AD3.

A coupling nut 33 that surrounds the outside of the plug frame 35 is disposed at the front end of the plug 3. The coupling nut 33 is substantially cylindrical and has a through bore and a small-diameter part 33A at the rear end thereof. The internal diameter of the small diameter part 33A is smaller than the external diameter of the flange 35F of the plug frame 35. A screw connecting part 33B is formed around the inner periphery of the through bore of the coupling nut 33, which is capable of threading together with a screw connecting part formed around the periphery of the engaging part AD3A of the adapter AD3.

The coupling nut 33 does not surround the holding part 7C of the plug holder 7. Accordingly, when aligning the optical fiber FB1, the holding part 7C can be used to manually rotate the plug holder 7 in relation to the plug frame 35. Further, after the position of the plug holder 7 in relation to the plug frame 35 is determined, adhesive can easily be supplied between the screw connecting parts of the plug frame 35 and the plug holder 7.

When the plug 31 is connected to the adapter AD3, the screw connecting part 33B screws together with the screw connecting part of the adapter AD3, while the small diameter part 33A of the through bore contacts the flange 35F and the plug frame 35 is urged in the direction of the adapter AD3.

The plug holder 7 of the plug 31 is constructed the same as the plug holder 7 of the plug 1 according to the first embodiment, however, a ring-shaped restraining member 17 is disposed around the outside of the holding part 7C of the plug holder 7. The outer diameter of the restraining member 17 is greater than the inner diameter of the small diameter part 33A of the through bore of the coupling nut 33 and prevents the coupling nut 33 from coming off the plug 31.

The restraining member 17A has a notch 17A (refer to FIG. 10B) and thereby the restraining member 17 is formed into a "C" shape. Because the restraining member 17 is so shaped, the internal diameter of the restraining member 17 can easily be changed, enabling the restraining member 17 to easily engage around the outside of the holding part 7C of the plug holder 7. Thus, the notch 17A of the restraining member 17 may vary in its circumferential extent.

When the FC connector plug 31 is coupled to the FC connector adapter AD3, the position of the engaging part 35D of the plug frame 35 is aligned to the engaging groove of the adapter AD3 and the plug frame 35 is inserted in the adapter AD3, before mutually screw connecting the screw connecting part of the coupling nut 33 and screw connecting part of the adapter AD3.

When the coupling of the plug 31 and the adapter AD3 is removed, the screw connecting part of the adapter AD3 and the screw connecting part of the coupling nut 33 is disconnected and the plug frame 35 is separated from the adapter AD3.

Referring again to FIG. 11, the processes involved when assembling the plug 31 of the second embodiment on an optical fiber cable will now be described. The processes up to step S11 for inspecting the end face of the ferrule are the same as those involved during the assembly of the plug 1 of the first embodiment to an optical fiber.

At step S13, because the connector is an FC type, the next step is to proceed to step S27.

At step S27, the restraining member 17 is engaged to the outer periphery of the holding part 7C of the plug holder 7, and the ferrule FE1 as well as the plug holder 7 and spring 9 already passed over the optical fiber are installed in the plug frame 35 with coupling nut 33 previously attached.

At step S29, the filler caulking ring 11 is caulked, securing the interstitial filler of the optical fiber cable, and the sheath caulking ring 13 is caulked, securing the sheath of the optical fiber cable.

At step S31, the boot 15 is disposed to cover the filler caulking ring 11 and the sheath caulking ring 11.

At step S33, in the same manner as applies with respect to the plug 1 of the first embodiment, the alignment of the optical fiber FB1 is performed while rotating the plug holder 7 in relation to the plug frame 5. This alignment is performed by coupling the assembled plug 31 with an alignment adapter (not shown). This alignment adapter is installed with an aligning master capable of holding the plug 31.

At step S35, in the same manner as applies with respect to the plug 1 of the first embodiment, the assembled plug 31 is disposed in the performance inspection master and an inspection of the condition of the optical connectivity thereof is performed.

The FC connector plug 31 according to the second embodiment exhibits substantially the same effects as the SC connector plug 1 of the first embodiment.

As described, the optical connector plugs 1 and 31 enable a ferrule to be non-incrementally rotated in relation to a plug without requiring the use of any special tool, thereby enabling the ferrule to be positioned at any desired angle of disposition in relation to the plug.

SC connectors and FC connectors of the invention can be used for polarization maintaining optical fibers as well as for single mode and multimode type optical fibers. That is to say, when such optical connectors connect polarization maintaining optical fibers, shift in the angle of the plane of polarization can be finely adjusted thereby enabling stable optical characteristics to be obtained.

Further, as the optical connector plug holder of the invention can be used for either an SC connector plug or an FC connector plug, the number of types of parts that are required is reduced, enabling a reduction in the parts required to be kept in storage. In addition, the plug holder of the invention can be mass-produced thereby realizing a reduction in production costs.

Again, when assembling either an SC connector plug or an FC connector plug in accordance with the invention, the processes up to the step of the inspection of the end face of the ferrule are identical. Accordingly, it is not necessary to perform different processes for SC connectors and FC connectors in the production thereof, so the size of production lots can be increased. In other words, according to the invention, parts can be shared and commonality exists in many of the processing steps required during assembly of the respective plugs, thereby enabling a reduction in costs required for parts and realizing a substantial improvement in productivity.

Moreover, according to the invention, when assembling an optical connector plug, concerns over fine particulate matter (arising during grinding of a ferrule) entering the plug when the ferrule is accommodated inside the plug are alleviated.

Although the invention has been described above by reference to certain exemplary embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A method for assembling an optical connector plug adapted to be attached to or detached from either an SC type or an FC type optical connector adapter, said optical connector plug comprising:

a plug frame internally supporting a ferrule secured to an end of an optical fiber such that said ferrule can rotate around the axial center of said ferrule; and a plug holder rotatably supported by said plug frame around said axial center of the ferrule, said plug holder being non-rotatably secured to said ferrule around said axial center of the ferrule, said plug holder having a holding part exposed outside of said plug frame, so that when assembling said optical connector plug, said ferrule is adapted to be rotated to a desired rotation angle in relation to said plug frame, said assembling method comprising the steps of:

passing an optical fiber through a plug holder;

inserting the end of said optical fiber in a ferrule and securing the end of said optical fiber in said ferrule;

grinding the end face of said ferrule together with the end face of said optical fiber; and after grinding, inserting said ferrule and said plug holder into a plug frame, thereby assembling the main body of said plug;

inserting the plug main body in an alignment adapter, then, with the optical fiber supported by the plug main body being optically connected to the optical fiber of the alignment adapter, aligning the optical fiber of the plug main body by non-incrementally rotating said plug holder in relation to said plug frame; and after aligning, securing said plug holder to the plug frame to be non-rotatable with respect thereto.

2. A method for assembling an optical connector plug according to claim 1, wherein said optical connector plug is adapted to couple to an SC connector adapter, said method further comprising a step of:

after securing said plug holder to the plug frame, removing said plug main body from said alignment adapter, then inserting and securing said plug main body in a housing.

3. An optical connector plug comprising:

a tubular frame having an internal surface with a female screw member;

a cylindrical flange rotatably supported within the tubular frame and fixed to the periphery of a ferrule;

a cylindrical holder that engages with the cylindrical flange to be movable along the axis of the cylindrical flange and be prevented from rotating relative to the cylindrical flange, said cylindrical holder having an external surface with a male screw member that directly engages with the female screw member of the tubular frame, and said cylindrical holder being rotatably supported within the tubular frame by the engagement of the screw members to be fixed at any angular position relative to the tubular frame to adjust an optical axis of an optical fiber fixed to the ferrule relative to an axis of the tubular frame; and a spring disposed between the cylindrical flange and the cylindrical holder, said spring biasing the cylindrical flange toward a forward direction along the axis of the tubular frame.

4. The optical connector plug according to claim 3, wherein said tubular frame includes an engagement surface for engaging the cylindrical flange and stopping the movement of the cylindrical flange in the forward direction.

5. The optical connector plug according to claim 3, wherein said cylindrical holder is fixed to the tubular frame by an adhesive.

6. The optical connector plug according to claim 3, further comprising a tubular housing mounted on the outside of the tubular frame.

7. The optical connector plug according to claim 6, wherein said tubular housing is adapted to engage with a SC type optical fiber connector adapter.

8. The optical connector plug according to claim 6, wherein said tubular housing is adapted to engage with a FC type optical fiber connector adapter.

9. The optical connector plug according to claim 3, wherein said cylindrical holder includes a holding part projecting from the tubular frame.

10. The optical connector plug according to claim 3, wherein the tubular frame supports the cylindrical holder such that the cylindrical holder can rotate with the ferrule and the cylindrical flange about the axis of the cylindrical flange relative to the tubular frame.

* * * * *